Patented Sept. 5, 1939

2,172,076

UNITED STATES PATENT OFFICE 2,172,076

PRODUCTION OF POROUS BUILDING MATERIALS

Hans Wolf, Hermann Leuchs, and Hans Saenger, Ludwigshafen-on-the-Rhine, Germany, assignors to I. G. Farbenindustrie Aktiengesellschaft, Frankfort-on-the-Main, Germany, a corporation of Germany No Drawing. Application May 4, 1929, Serial No. 360,616. In Germany May 5, 1928

21 Claims. (Cl. 106—18)

The present invention relates to the production of porous building materials.

Although the customary process of pouring concrete in the building industry furnishes building materials of high tensile and compression strength, it is attended with drawbacks which are considerable when the building materials to be produced are not required to be specially strong. In these cases, the concrete building material forms a useless ballast, owing to its heavy weight, entails the consumption of unnecessary quantities of expensive material, and furnishes walls which are defective as regards the insulation of heat and sound.

We have now found that building materials which are porous and free from the said drawbacks can be produced in a highly advantageous manner, by making the hydraulic mineral binding media into a frothy pulp with the aid of sulphonation products of organic compounds containing at least six carbon atoms in their molecule such as Turkey red oil, the sulphonation product of tall oil or the sulphonic acids of long chain fatty acids, such as stearic, oleic or ricinoleic acids, or of mineral or tar oils or fractions thereof and especially those of alkylated aromatic hydrocarbons, or their salts which are equivalents for the purposes of the present invention, and the mixing liquid, the said pulp being then cast into moulds in the usual manner. All the aforesaid sulphonation products will be referred to for the sake of brevity in the following as foam producing sulphonation products or sulphonic acids.

The quantity employed of the said agents can be varied depending on the desired degree of porosity. Generally only less than one per thousand by weight of the hydraulic binding agent will be sufficient, for example even the thousandth part of one per cent, but in particular cases the quantity may be increased up to about one per cent. The masses prepared in this manner are easily poured, stand well in the shapes or moulds and exhibit, when set, a perfectly homogeneous microporous structure of low specific gravity. The sulphonic acids employed can be chosen from the great number of products of this kind which are well known and employed as wetting out agents especially for use in the textile industry.

The production of the porous building materials may be effected in various ways. For example, the special kind of cement chosen or other hydraulic mineral binding medium such as gypsum, or a mixture of the cement or binding medium with suitable additions such as sand, gravel, sawdust, pumice or the like, may be mixed with the sulphonic acids or the sulphonate, for example, the sodium salt of isopropylated naphthalenesulphonic acid, together with water or other mixing liquid, and the mixture worked into a uniform froth by means of the customary mixing machines or of stirrers, the introduction of gases, or in any other known and suitable way. The froth forming sulphonic acid or a salt thereof may, however, be added in the dry state to the hydraulic mineral binding medium, or to the mixture of the same and the additions, prior to adding the mixing liquid; or it may be dissolved in the mixing liquid and then incorporated with the other components. The foam can be cast into moulds for the preparation of articles of any form and size, or parts of buildings can be cast directly into the desired position on a building. If desired the masses or their constituents can be incorporated, before casting, with agents accelerating the setting of the cast mass, for example calcium chloride, waterglass or a small quantity of caustic soda lye; a considerable acceleration of setting can be obtained also by adding about 10 per cent of alumina cement to Portland cement or by the employment of hot water or by the conjoint application of several of these measures.

The masses prepared according to this process can be adapted within wide limits, in respect of specific gravity and porosity, to the purposes in view, for example as building material or insulating material or for other purposes according to the amount of the froth forming sulphonic acid, the kind or intensity of the stirring, the amount of the mixing liquid and the kind and quantity of the additions. The building materials can be cut, nailed and sawn.

The following example will further illustrate the nature of the said invention which however is not restricted thereto. The parts are by weight.

Example 100 parts of Portland cement, to which may be added suitable proportions say about 400 parts of additions such as pumice, slag, sand, gravel, sawdust and the like, are mixed in the dry state with 0.1 part of the sodium salt of isopropylated naphthalenesulphonic acid, and then thinned down with the usual quantity of water. The mixture is stirred or beaten to a frothy pulp, which can be poured direct into moulds, shapes or the like, and sets to a microporous mass.

The sodium salt of propylated naphthalenesulphonic acid may also be first worked up into froth with water, and then mixed with the cement, or the mixture of cement, fragments of pumice and the like, or the aqueous solution of the sodium propylnaphthalenesulphonate may be added to the cement or mixture, the frothy mass being produced, in pourable condition, by stirring or beating.

The aforesaid sodium salt may be replaced by that of a mono- or di-butyl naphthalene sulphonic acid, or the sulphonic acids referred to in the description, and the setting of the mass may be accelerated by adding thereto before pouring 3 per cent its weight of calcium chloride or of about 10 per cent of alumina cement with reference to the quantity employed of Portland cement.

What we claim is:

1. As new articles of manufacture porous building materials comprising a hydraulic mineral binding agent as the binding substance and a sulphonic acid of an aromatic compound containing an alkyl radical.

2. As new articles of manufacture porous building materials comprising a hydraulic mineral binding agent as the binding substance and a naphthalene sulphonic acid containing an alkyl radical.

3. As new articles of manufacture porous building materials comprising a cement and a naphthalene sulphonic acid containing an alkyl radical.

4. As new articles of manufacture porous building materials comprising a cement and a naphthalene sulphonic acid containing an alkyl radical with from 4 to 5 carbon atoms in its molecule.

5. As new articles of manufature porous building materials comprising a cement and up to 1 per cent of the cement of a butylnaphthalene sulphonic acid.

6. A moldable composition material resulting from a mixture comprising water, an inorganic, calcareous, construction material having plastic properties as the major ingredient and selected from the group consisting of calcined gypsum and Portland cement and a substance selected from the group consisting of sulphonic acids of alkylated aromatic polynuclear hydro-carbons and salts thereof.

7. A moldable composition material resulting from a mixture comprising water, an inorganic, calcareous, construction material having plastic properties as the major ingredient and selected from the group consisting of calcined gypsum and Portland cement and a sulphonic acid of alkylated naphthalene.

8. A moldable composition material resulting from a mixture comprising water, an inorganic, calcareous, construction material having plastic properties as the major ingredient and selected from the group consisting of calcined gypsum and Portland cement and the sodium salt of a sulphonic acid of alkylated napthalene.

9. A moldable composition material resulting from a mixture comprising water, an inorganic, calcareous, construction material having plastic properties as the major ingredient and selected from the group consisting of calcined gypsum, and Portland cement and the sodium salt of iso-propyl naphthalene sulphonic acid.

10. A dry mixture for gauging with water and suitable for making self-sustaining casts and comprising an inorganic, calcareous, construction material having plastic properties as the major ingredient and selected from the group consisting of calcined gypsum and Portland cement and a substance selected from the group consisting of sulphonic acids of alkylated aromatic polynuclear hydrocarbons and salts thereof.

11. A dry mixture for gauging with water and suitable for making self-sustaining casts and comprising an inorganic, calcareous, construction material having plastic properties as the major ingredient and selected from the group consisting of calcined gypsum and Portland cement and a sulphonic acid of alkylated naphthalene.

12. A dry mixture for gauging with water and suitable for making self-sustaining casts and comprising an inorganic, calcareous construction material having plastic properties as the major ingredient and selected from the group consisting of calcined gypsum and Portland cement and the sodium salt of a sulphonic acid of alkylated naphthalene.

13. A dry mixture for gauging with water and suitable for making self-sustaining casts and comprising an inorganic, calcareous, construction material having plastic properties as the major ingredient and selected from the group consisting of calcined gypsum and Portland cement and the sodium salt of iso-propyl naphthalene sulphonic acid.

14. A composition material of a cellular texture resulting from a mixture comprising water, an inorganic material having plastic properties and capable of setting in the presence of water as the major ingredient, a gas for forming bubbles in the mixture, and a substance selected from the group consisting of sulphonic acids of alkylated aromatic polynuclear hydro-carbons and salts thereof.

15. A composition material of a cellular texture resulting from a mixture comprising water, an inorganic material having plastic properties and capable of setting in the presence of water as the major ingredient, a gas for forming bubbles in the mixture, and a sulphonic acid of alkylated naphthalene.

16. A composition material of a cellular texture resulting from a mixture comprising water, an inorganic material having plastic properties and capable of setting in the presence of water as the major ingredient, a gas for forming bubbles in the mixture, and the sodium salt of a sulphonic acid of alkylated naphthalene.

17. A composition material of a cellular texture resulting from a mixture comprising water, an inorganic material having plastic properties and capable of setting in the presence of water as the major ingredient, a gas for forming bubbles in the mixture, and the sodium salt of iso-propyl naphthalene sulphonic acid.

18. A mouldable composition material resulting from a mixture comprising water, a hydraulic mineral binding agent as the major ingredient and a substance selected from the group consisting of sulphonic acids of aromatic compounds containing an alkyl radicle and salts thereof.

19. A dry mixture for gauging with water and suitable for making self-sustaining casts and comprising a hydraulic mineral binding agent as the major ingredient and a substance selected from the group consisting of sulphonic acids of aromatic compounds containing an alkyl radicle and salts thereof.

20. As new articles of manufacture porous building materials comprising a hydraulic mineral binding agent as the binding substance, a sulphonic acid of an aromatic compound containing an alkyl radicle and calcium chloride.

21. As new articles of manufacture porous building materials comprising Portland cement, up to 1% of such cement of a butyl-naphthalene sulphonic acid and about 10% of such cement, of alumina cement.

HANS WOLF.
HERMANN LEUCHS.
HANS SAENGER.